United States Patent
Nakatsukasa et al.

(10) Patent No.: US 6,752,400 B2
(45) Date of Patent: Jun. 22, 2004

(54) MOVING UNIT

(75) Inventors: Eiji Nakatsukasa, Kyoto (JP);
Hidenori Hanami, Shiga (JP);
Hiroharu Kitamura, Kyoto (JP);
Kanji Mikami, Shiga (JP); Katsutoshi Kamoto, Kyoto (JP)

(73) Assignee: Shimadzu Mectem, Inc., Otsu (JP)

( * ) Notice: Subject to any disclaimer, the term of this patent is extended or adjusted under 35 U.S.C. 154(b) by 96 days.

(21) Appl. No.: 10/048,471

(22) PCT Filed: Jun. 4, 2001

(86) PCT No.: PCT/JP01/04713
§ 371 (c)(1),
(2), (4) Date: Feb. 7, 2002

(87) PCT Pub. No.: WO01/94185
PCT Pub. Date: Dec. 13, 2001

(65) Prior Publication Data
US 2002/0104692 A1 Aug. 8, 2002

(30) Foreign Application Priority Data
Jun. 9, 2000 (JP) ........................................ 2000-174532
Jan. 10, 2001 (JP) ........................................ 2001-003103

(51) Int. Cl.[7] ............................................... B62B 5/02
(52) U.S. Cl. ............................... 280/5.2; 280/DIG. 10; 180/8.2; 180/8.3
(58) Field of Search ............................... 280/5.2, 304.1, 280/DIG. 10; 180/8.1–8.5

(56) References Cited

U.S. PATENT DOCUMENTS

| | | | | |
|---|---|---|---|---|
| 3,304,094 A | * | 2/1967 | Wenger | 280/11 |
| 4,119,163 A | | 10/1978 | Ball | 180/6.5 |
| 4,132,423 A | * | 1/1979 | Chant | 280/5.3 |
| 5,228,709 A | * | 7/1993 | Kao | 280/244 |
| 5,263,547 A | * | 11/1993 | Alber | 180/357 |
| 5,273,296 A | * | 12/1993 | Lepek | 180/8.2 |
| 5,423,563 A | * | 6/1995 | Wild | 280/250.1 |
| 5,579,857 A | * | 12/1996 | Abe et al. | 180/8.2 |
| 5,829,763 A | * | 11/1998 | Jeavons | 280/5.2 |
| 6,062,600 A | | 5/2000 | Kamen et al. | 280/755 |
| 6,158,536 A | * | 12/2000 | Misawa | 180/9.32 |
| 6,164,398 A | * | 12/2000 | Alber | 180/8.1 |
| 6,328,120 B1 | * | 12/2001 | Haussler et al. | 180/8.2 |
| 6,341,784 B1 | * | 1/2002 | Carstens | 180/8.2 |

FOREIGN PATENT DOCUMENTS

| | | |
|---|---|---|
| JP | 60-4401 | 1/1985 |
| JP | 5-94080 | 12/1993 |
| JP | 6-51473 | 7/1994 |
| JP | 7-137638 | 5/1995 |
| JP | 11-500331 | 1/1999 |
| JP | 2000-514680 | 11/2000 |
| WO | WO 96/23478 | 8/1996 |
| WO | WO 98/02122 | 1/1998 |
| WO | WO 00/75001 | 12/2000 |

* cited by examiner

Primary Examiner—Lesley D. Morris
Assistant Examiner—L. Lum
(74) Attorney, Agent, or Firm—Westerman, Hattori, Daniels & Adrian, LLP

(57) ABSTRACT

A moving unit provides a wheel that supports a body portion in a condition that the body portion can be moved, a supporting member that is mounted at a position that does not interfere with rotation of the wheel and an arm that is mounted at a position shifted from an axis of the supporting member and that can move a distal end of the arm toward a direction away from the axis of the supporting member by being driven with the supporting member as a foothold and is so arranged that the body portion can be lifted up together with the wheel by grounding the distal end of the arm when the moving unit is transported, the crank and the arm are incorporated around an axle of the wheel in a compact state, which makes it possible to operate the moving unit stably.

10 Claims, 12 Drawing Sheets

Fig. 5
(a)
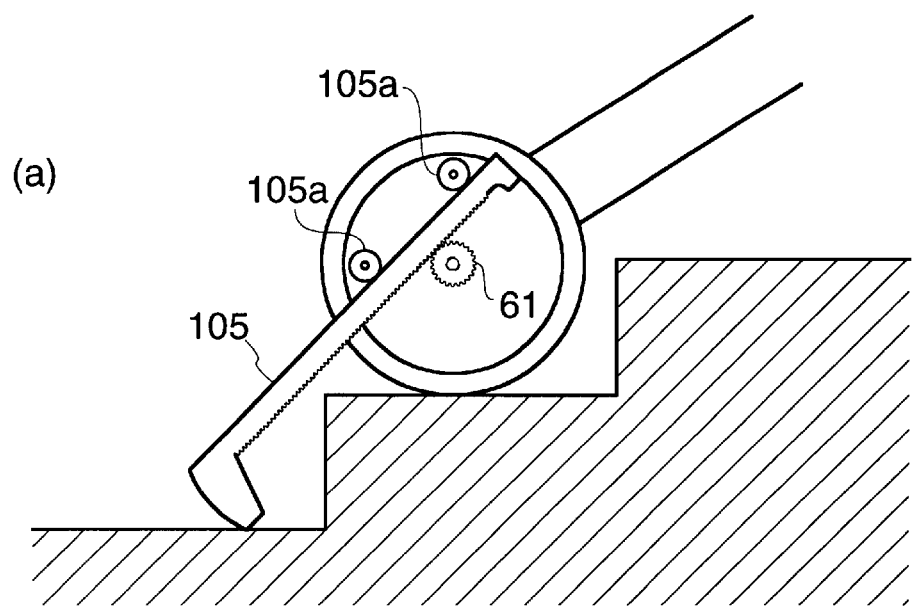
(b)
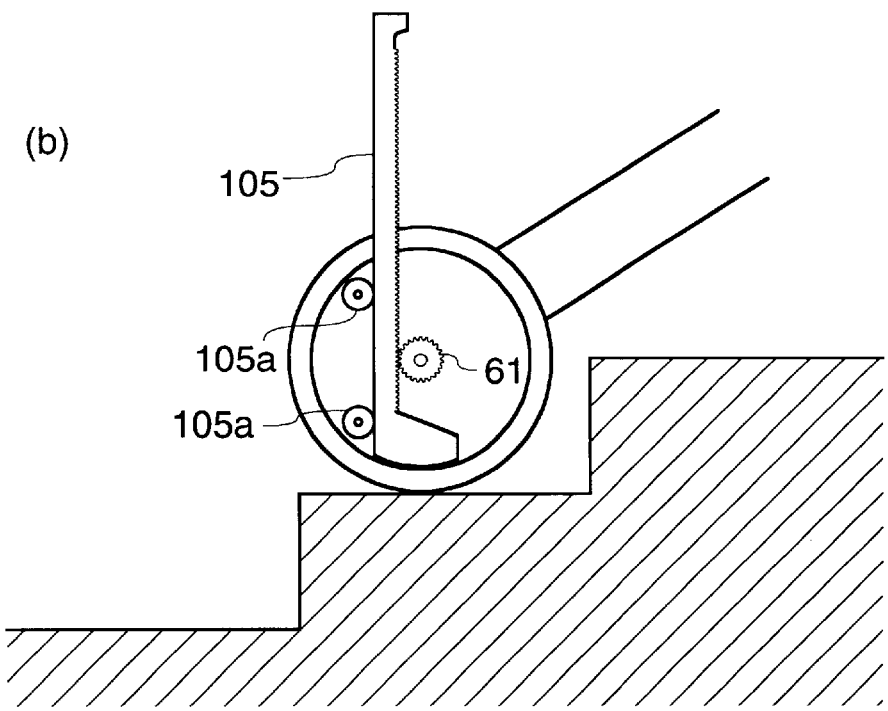

(a)  (b)

MOVING UNIT

FIELD OF THE ART

This invention relates to a moving unit that can be utilized as a transporting unit, care aid equipment, walking aid equipment, rehabilitation training equipment, an electric wheelchair or a wheel-moving robot.

BACKGROUND ART (1) Varieties of moving units have been developed. For example, a forklift, a lifter or a handcart is well-known as a moving unit for transporting goods and a wheelchair is well-known as a moving unit for transporting a person.

However, all of passages where the moving unit moves are not flat and there might be a staircase or an obstacle on the passage. Then it is difficult for the moving unit having a wheel to move over a level difference whose height exceeds a radius of the wheel.

In order to make it possible for a moving unit having a wheel to move on a passage having a level difference, a level difference overcoming mechanism in which a multi-joint link or the like is incorporated has been developed so as to lift up a body portion of the moving unit.

However, the multi-joint link has a large number of components, which makes is difficult to downsize a body portion. Especially for a moving unit that transports a small package with two wheels driven it is preferable to incorporate the level difference overcoming mechanism into a body portion in a compact state.

The present claimed invention intends to realize a moving unit that is provided with a function which can serve as a role of a level difference overcoming mechanism and can be applied to other diversity of usages as well.

(2) Conventionally, in order to make it possible for a machine to make an up and down movement to go up or down a level difference such as a staircase, the machine is provided with a mechanism of the up and down movement which has previously been designed to make a specific movement in accordance with a shape of a level difference or the machine is loaded with a camera so as to recognize a level difference by an image processing.

However, for a case that the up and down mechanism has been designed in accordance with a shape of the level difference, a range of a level difference with which the up and down mechanism can deal is restricted and it becomes difficult to cope with a diversity of shapes of level differences, which leads to a problem such as that it does not function sufficiently and it is difficult to secure safety.

For a case of image processing, there is a problem that it requires a complicated and advanced signal processing and that accuracy in detecting the level difference is not high in spite of the complicated and advanced signal processing required.

DISCLOSURE OF THE INVENTION (1) In order to solve the problem a moving unit of the present claimed invention comprises a wheel that supports a body portion in a condition that the body portion can be moved, a supporting member that is rotatably mounted at a position that does not interfere rotation of the wheel in a condition that can be driven and an arm that is mounted at a position shifted from a rotational center of the supporting member and that can move a distal end of the arm toward a direction away from the rotational center of the supporting member by being driven with the supporting member as a foothold, and is characterized by that the body portion can be lifted up together with the wheel by grounding the distal end of the arm when the moving unit is moved. It is especially preferable that the supporting member is mounted on the same axis as an axle of the wheel in order not to prevent rotation of the wheel.

With the above arrangement, it is possible to move a position at which the arm is supported by the supporting member within a movable range if the supporting member is rotated around the axis on which the supporting member is mounted. If the distal end of the arm whose supported position has been moved is driven by a supporting member so as to move toward a direction away from the axle, the body portion can be lifted up to a position where a level difference can be overcome by making use of reaction when the distal end of the arm touches a corresponding face every time the arm moves. Especially, in case that the supporting member is arranged to have the same axis as that of the axle of the wheel, the arm also rotates around the axle of the wheel. As a result, there is no need of considering interference among the supporting member, the arm and the axle of the wheel and it becomes possible to incorporate the arm and the supporting member around the axle in a compact state. It is a matter of course that the level difference overcoming mechanism can be arranged on a position a little shifted from the axle.

It is preferable that a driving system that drives the supporting member and a driving system that drives the arm are arranged so that each of the driving systems operates independently.

In accordance with the arrangement in which each of the arm and the supporting member is driven by a different driving system, it is possible to operate the supporting member and the arm independently, which makes it possible to operate the supporting member and the arm optimally based on a height of a level difference so as to minimize an up and down movement of the moving unit. As a result, jolt that is applied to a load or a nursed person (in case of a wheel chair) becomes small and force that is applied to the handle also becomes small. In addition, in case the moving unit is utilized as care aid equipment, it is possible to reduce a load for a cared person and a care person as well.

Especially, if the arm is arranged to be grounded near a position where the wheel is grounded, it becomes possible for the center of gravity to move less when the load is transferred from the wheel to the arm, thereby to make a movement of transferring the load smooth and effectively to prevent unstable condition due to force occurring in a moment of transferring the gravity as well.

As a result of this, since the moving unit of the present claimed invention has a pair of parallel wheels as a driving wheel and the body portion is supported by an operator through the handle while moving a passage having a level difference, it can be extremely preferable to reduce a load for an operator.

As a concrete arrangement of the arm it is preferable that the arm is in a vertical posture and at least a distal end of the arm is accommodated within a diameter of the wheel when a position where the arm is supported by the supporting member locates vertically above the axle of the wheel and that the arm moves toward a direction to project the distal end of the arm out of the diameter of the wheel when the position where the arm is supported by the supporting member moves away from the above position.

In order to make it possible to rotate a position at which the arm is supported at 360 degrees without interfering a movement of the wheel when the arm and the supporting member rotates together with the wheel it is preferable that each of the arm and the supporting member is in a shape that can be accommodated within a diameter of the wheel.

It is a matter of course that the moving unit can be utilized as objects or usages other than overcoming a level difference by making use of the above-mentioned fundamental movement.

(2) In addition, a moving unit of the present claimed invention comprises a wheel that supports a body portion in a condition that the body portion can be moved, a supporting member that is mounted at a position that does not interfere rotation of the wheel in a condition that can be rotatably driven and an arm that is mounted at a position shifted from an axis of the supporting member and that can move a distal end of the arm toward a direction away from the axis of the supporting member by being driven with the supporting member as a foothold and is characterized by that a detecting means is provided at a side where the arm is grounded so as to measure a shape of level difference by moving the detecting means with an operation of the arm in the level difference.

With this arrangement, a separately provided detecting means is not required since the arm that is used for an up and down movement can be utilized as the detecting means and an advanced processing such as an image processing is not required as well, resulting in providing a simple and secure function of overcoming a level difference. In addition, since this moving unit makes use of a continuous movement of the arm that makes an up and down movement in order to detect a level difference, it is possible to detect the level difference effectively. Further, it only requires the arm be controlled in accordance with the detected level difference, which makes it possible to deal with a diversity of level difference simply and securely.

Especially it is preferable that the supporting member and the arm are arranged to gather around a center between the facing wheels. With this arrangement, it is possible to provide the moving unit as far as there are at least a set of a supporting member and an arm, thereby to improve safety for a person who is around the wheel.

It is preferable that a grounding portion of the arm is ark-shaped and so arranged to roll over the ground. With this arrangement, since a position where the body portion is supported moves from the wheels to the level difference through the arm smoothly, force applied to the handle and fluctuation of force applied can be made small as well. Further, since rotation of the arm propels the body portion to move forward (backward), force that is to be applied forward (backward) by the operator will be made small when the moving unit moves in a passage with a level difference, thereby to lessen a load for the operator.

BRIEF DESCRIPTION OF THE DRAWINGS

FIG. 5 is a view showing a modified form of the present claimed invention.

BEST MODES OF EMBODYING THE INVENTION

The invention will be described in detail with reference to an embodiment thereof shown in the accompanying drawings.

<First Embodiment>

Figure 1:
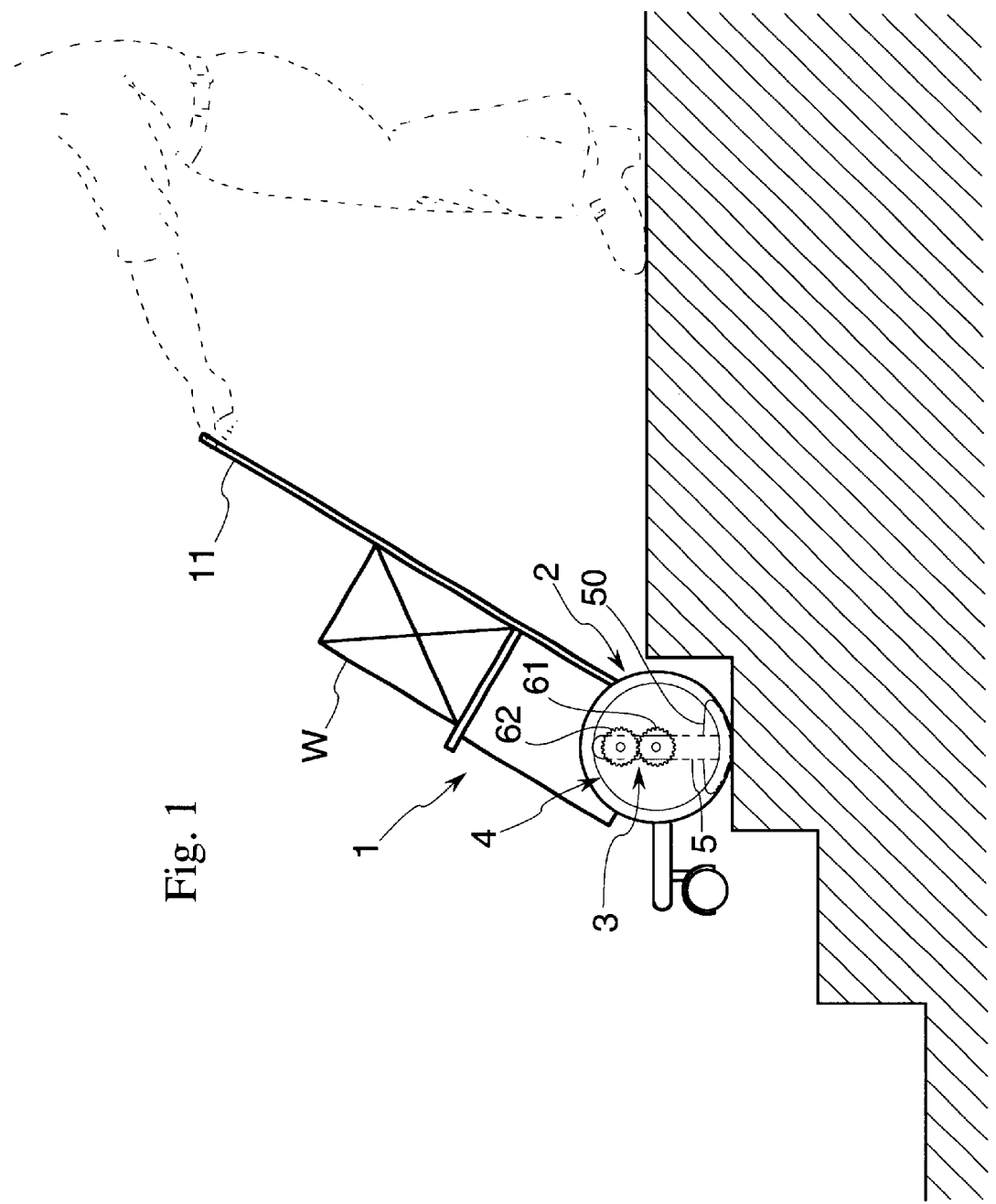
FIG. 1 is a schematic view showing a first embodiment of the present claimed invention in a condition of being used.

A moving unit of a first embodiment shown in FIG. 1 is so arranged that a body portion 1 from which a handle 11 is projected is supported by a pair of wheels 2 in a condition of being able to move and the body portion 1 can carry and transport a load $\underline{W}$ with the handle 11 grasped. A level difference overcoming mechanism 3 is incorporated so as to lift up the body portion 1 together with the wheels 2 to a position where a level difference is overcome when the moving unit is required to overcome the level difference.

Figure 2:
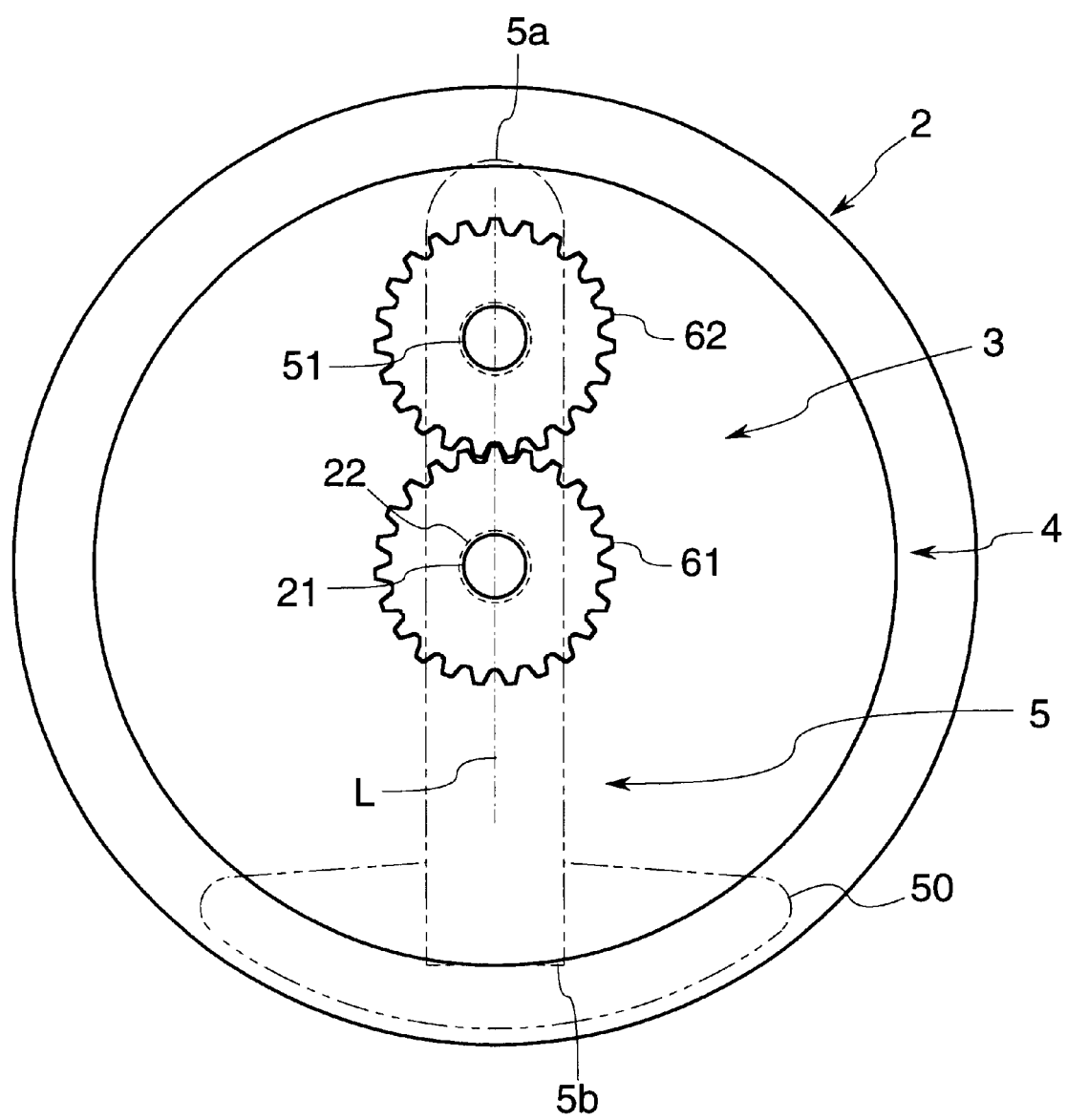
FIG. 2 is a front view showing a principle portion of the embodiment.
Figure 3:
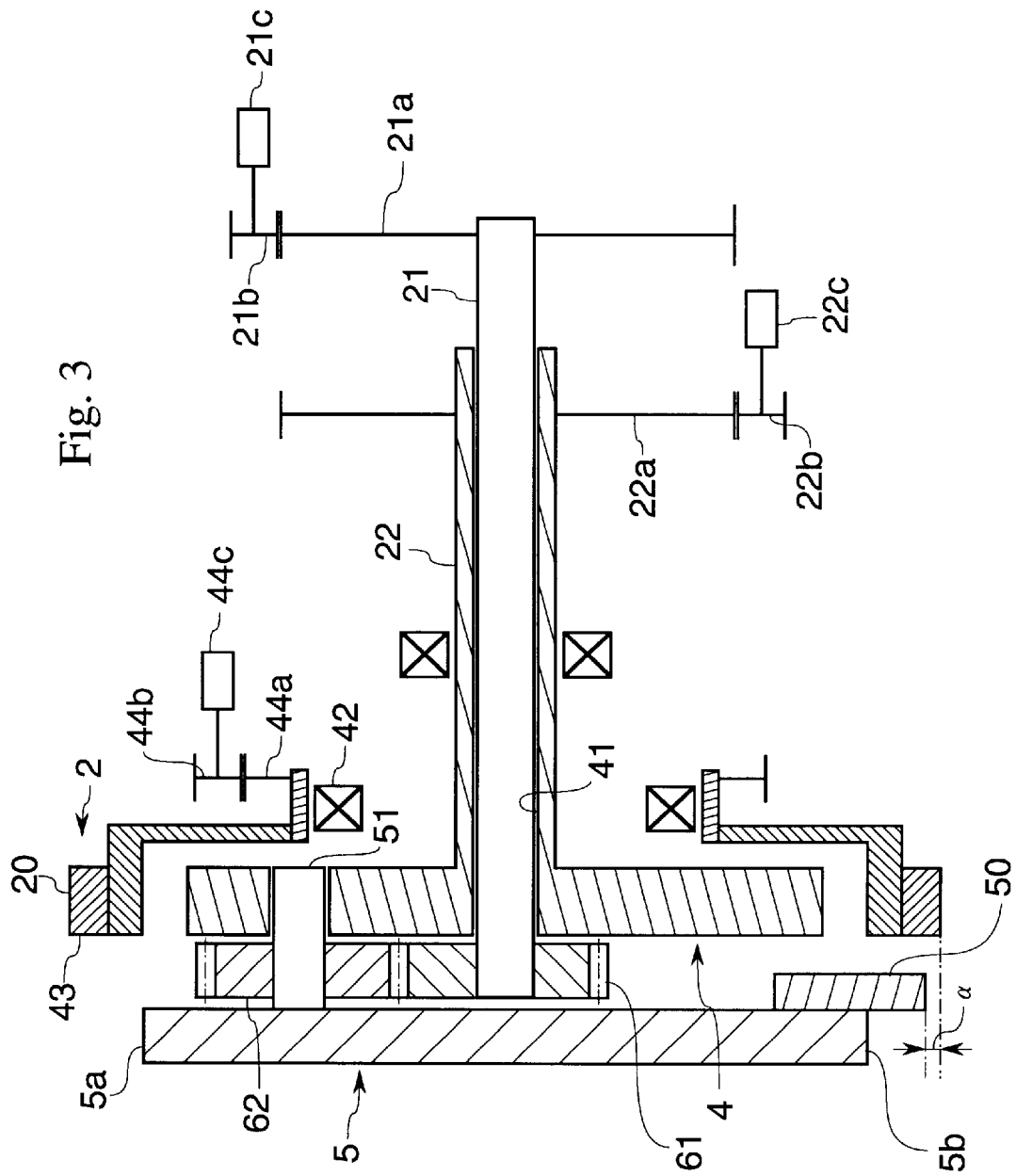
FIG. 3 is a cross-sectional view of the FIG. 2.

The level difference overcoming mechanism 3 mainly comprises, as shown in FIG. 2 and FIG. 3, a crank 4 as a supporting member and an arm 5 that is supported by the crank 4.

In mounting the crank 4, a pipe member 22 is fitted over an outer circumference of an axle 21 in a relatively rotatable condition and each of the axle 21 and the pipe member 22 can be rotatably driven through gears 21a, 21b or gears 22a, 22b by a motor 21c, 22c respectively. A component shown by a numerical code 22x is a bearing.

The crank 4 has a shape of a disk that is mounted on a distal end of the pipe member 22 in an integrally rotatable condition and a center of which provided is a through hole 41 through which the axle 21 passes and a distal end of the axle 21 projects from the through hole 41 so as to axially mount a first gear 61. A drum 43 is rotatably mounted on an appropriate position of the body portion 1 through a bearing 42, a tire 20 is mounted on an outer circumference of the drum 43 that constitutes the wheel 2, a motor 44c is connected with the drum 43 through gears 44a, 44b and the tire 20 can be rotatably driven together with the drum 43 by the motor 44c.

The arm 5 is mounted on a position shifted from a rotatable center of the crank 4 through an axle 51 so as to be able to rotate near a proximal end 5a of the arm 5 wherein a second gear 62 is axially mounted on the axle 51 and the second gear 62 gears with the first gear 61 circumscribably. A grounding body 50 is mounted on a side of a distal end 5b of the arm 5. The grounding body 50 is generally in a shape of a cocoon whose outer circumference is an arc whose diameter equals to a diameter of the wheel 2 minus α and is so arranged that the grounding body 50 provided on the distal end 5b of the arm 5 can make a rocking motion back and forth without making a contact with ground when the axle 51 of the arm 5 locates at the highest position with the wheel 2 placed on the ground (refer to FIG. 2) irrespective of a posture or an angle the body portion 1.

As is clear from the above explanation and the drawings, a driving system that drives the crank 4 and a driving system that drives the arm 5 are arranged so that each of the driving systems operates independently as shown in the drawings.

Next, a method of handling the moving unit will be explained. In case the moving unit moves on an ordinary flat passage, the moving unit moves by driving the wheel 2 with the arm 5 kept in a state shown in FIG. 2. At this time the arm 5 is stored in a position where a center line L of the arm 5 coincides with the line passing the center of the crank 4, namely, the center of the axle 21 and the arm 5 does not contact with a face of the passage even though the crank 4 rotates together with the wheel 2.

Figure 4:
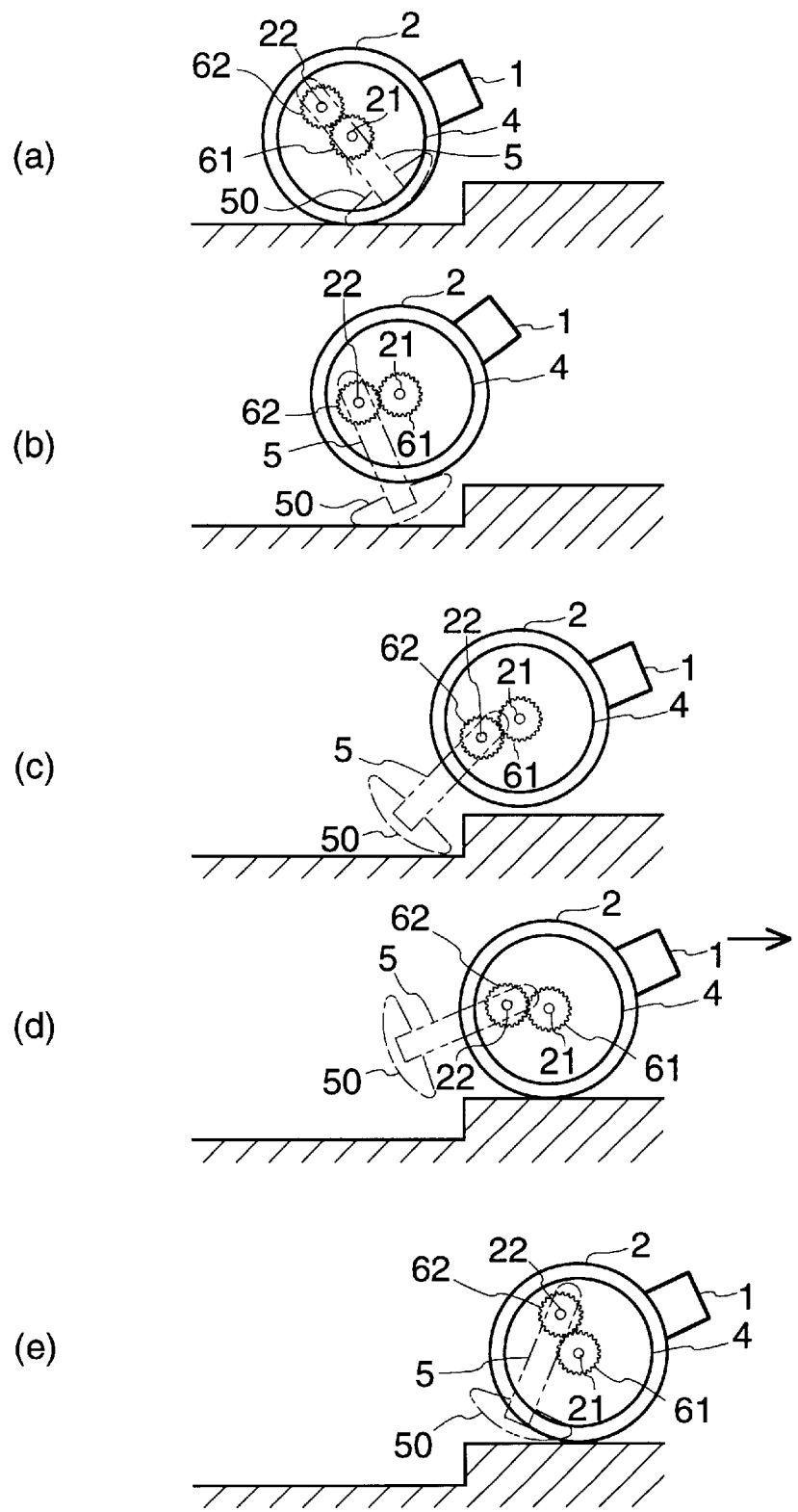
FIG. 4 is an explanatory view of operation of the embodiment.

In case there is a level difference in the passage, the moving unit stops before the level difference as shown in FIG. 4(a) and drives the motor 21c. At this time the second gear 62 makes a planetary movement around the first gear 61 and the arm 5 whose proximal end is mounted on the second gear 62 rotates counterclockwise so as to move the grounding body 50 away from the axle 21. Then a part of the grounding body 50 is grounded near a position where the wheel 2 is in contact with the ground. Next, drive the motor 2c so as to rotate the crank 4 mounted on the pipe member 22 counterclockwise. At this time the second gear 62 is fixed through the arm 5, then the first gear 61 makes a planetary movement around the second gear 62 so as to lift up the axle 21 along an ark whose center is the axle 51 of the second gear 62 (FIG. 4(b)). During this process all the operator of the moving unit has to do is just grasp the handle 11. After the axle 21 is lifted up to a certain degree, the operator pulls forward the handle 11 provided with the body portion 1 (FIG. 4(c)) so as to ground the wheel 2 on an upper level (FIG. 4(d)) and then the arm 5 is lifted up. In order to lift up the arm 5 the motor 21c is driven until the center line L of the arm 5 coincides with the line where the axle 21 passes as shown in FIG. 2. For a case there are continuous level differences, conduct the above operation repeatedly, and for a case there is a lower level difference, operate the level difference overcoming mechanism 3 reverse to the above operation.

As mentioned above, since the moving unit of the embodiment has an arrangement in which the crank 4 is mounted on the same axis as the axle 21, a position where the arm 5 is supported by the crank 4 can be moved around the axle 21 if the crank 4 is rotated around the axle 21. If the grounding body 50 mounted on the distal end of the arm 5 whose supported position (the axle 51) has been moved is driven to move toward a direction away from the axle 21 by making use of the crank as a foothold, the body portion 1 can be lifted up to a position where a level difference can be overcome by making use of reaction every time the grounding body 50 touches a corresponding face to be grounded when the grounding body 50 moves. As mentioned above, since the crank 4 is arranged on the same axis as the axle 21 and the arm 5 rotates around the axle 21, there is no need of considering interference of the crank 4 or the arm 5 with the axle 21 and a range in which the arm 5 moves can be made small. As a result, the level difference overcoming mechanism 3 can be incorporated in a compact state around the axle 21, thereby to increase an amount of capacity and to effectively improve safety.

Especially, if the arm 5 is arranged to be grounded near a position where the wheel 2 is grounded, a movement of a center of gravity can be made small when a load is transferred from the wheel 2 to the arm 5, thereby to make a movement of transferring smooth and effectively to prevent unstable condition due to force occurring in a moment of transferring the gravity as well. Especially, in accordance with the moving unit of this embodiment the level difference overcoming mechanism 3 is driven in a condition that a pair of wheels arranged in parallel are placed on the ground and one end of the moving unit is grasped with the handle 11, thereby to minimize fluctuation of force that supports the moving unit. This contributes to lessening load to operate the handle for the operator.

Especially since the arm 5 is so arranged when a position where the arm 5 is supported by the crank 4 locates vertically above the axle 21, the arm 5 is in a vertical posture and at least a distal end of the arm 5 is accommodated within a diameter of the wheel 2 and when the position where the arm 5 is supported by the crank 4 moves away from the above position, the arm 5 moves toward a direction to project the grounding body 50 out of the diameter of the wheel 2, the grounding body 50 of the arm 5 can be moved to an arbitrary position irrespective of a posture (angle) of the body portion 1 within a total length of the crank 4 and the arm 5. As a result, the arm 5 can be grounded at the optimum position irrespective of a posture of the body portion 1 in level difference, thereby to lessen fluctuation of force that supports the moving unit in a situation of a diversity of level differences, which makes it possible to make a smooth and stable up-and-down movement.

Since the arm 5 and the crank 4 can be accommodated within a diameter of the wheel 2, neither the arm 5 nor the crank 4 disturbs a movement of the wheel 2 when the arm 5 and the crank 4 rotate together with the wheel 2, which makes it possible to rotate a position at which the arm 5 is supported at 360 degrees.

Further, in a passage without level differences it is possible to make use of the arm 5 for a diversity of usages such as loading or unloading.

It is a matter of the fact that the arrangement of this invention is not limited to the above-mentioned embodiment. For example, basically a number of the wheels is a parallel two, however, it may be one, three or four.

Whether there is a level difference or not or a height of the level difference may be detected by the use of a limit switch or a proximity sensor and an angle or a posture of the level difference may be detected by the use of a rotary encoder or a gyroscope to appropriately control the level difference overcoming mechanism.

The driving system can be commonized with a clutch or a break provided between each of the axles. For example, a wheel and a crank may be switched to drive with a single motor. Or a pair of parallel wheels can be driven through a differential gear like an automobile.

Force to drive the arm may be transmitted through an idler gear or a chain in addition to direct transmission between the first gear and the second gear. A driving system of the arm can be incorporated into the crank.

The gear may be arranged inner side of the crank locating opposite to the arm. In this case, the pipe member drives the first gear and the axle of the wheel drives the crank.

The second gear 62 may be in a shape of a rack, as shown in FIG. 5, and the rack can be used as an arm 105. In this case, if the rack is secured to extend upward so as to broaden a range within the arm 105 can move, it becomes possible to overcome a higher level difference. 105a designates a guide roller that guides the arm 105 to make a linear movement.

Figure 6:
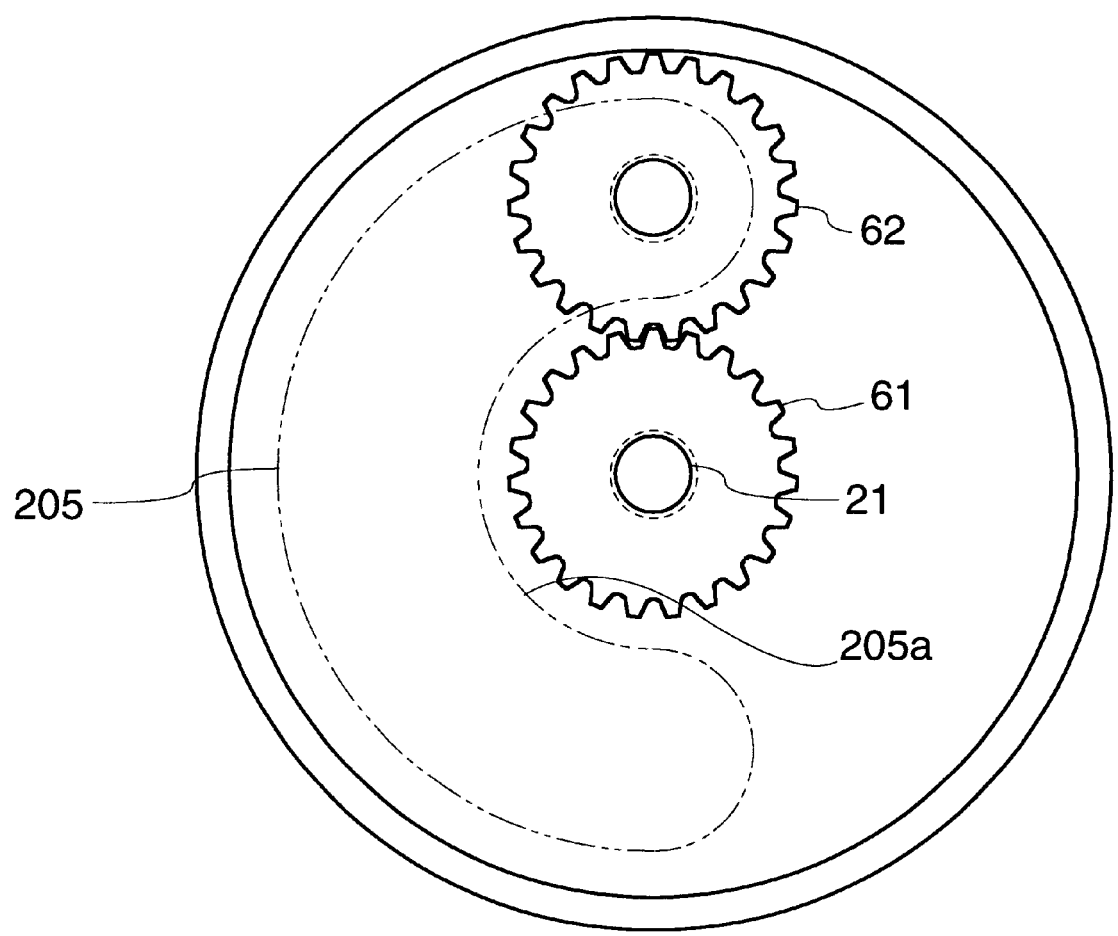
FIG. 6 is a view showing another modified form of the present claimed invention.

As shown in FIG. 6, an arm 205 that is curved along a half circle corresponding to a diameter of the wheel 2 may be used. In this case, the arm 205 is not symmetry, however, a range within the arm 205 can move is broadened, which makes it possible to rotate the arm 205 continuously to a rotation of the wheel 2 before a level difference, thereby to lift up the wheel 2 smoothly like climbing a slope. In addition, since it is possible for the arm 205 to avoid interference with the wheel 2 due to a concave portion 205a of the arm 205, the arm 205 can be arranged in a side of the axle 21 of the wheel.

An end effector (an adaptor) such as a shoe, an auxiliary wheel, a fork, a hook, a toe (a second arm) or a hand may be mounted on the arm so as to be selected in accordance with a shape of a load or a condition of transportation. The operation of changing the end effector may be automated with an operation of the arm.

As shown in FIG. 1, an auxiliary wheel of a caster type may be mounted in front of the body portion. It is also effective if a stopper of a hinge type is provided below and in front of the body portion 1 so as not to incline the moving unit exceeding a limit in a safety range of an inclining angle with the stopper grounded when the body portion 1 inclines downward exceeding the limit.

In case there is a level difference, a load carrier may be inclined so as to lower a center of gravity. The handle may be elongated a little so as to operate at a place a little away from the body portion.

In addition, a step may be provided at a rear of the body portion so as to carry an operator.

A level difference and a height of the level difference may be detected from an image processing by the use of a CCD camera so as to drive the arm. In this case, it is possible to set the arm in the optimum phase while approaching a level difference, thereby to overcome the level difference without breaking a movement.

In case a load is a person, a support jig may be used to support an elbow, a shoulder or a waist of the person.

The moving unit can be used as walking aid equipment if a seat can be recessed rear of the body portion, an armrest can be held upward through a spring and the armrest can support a part of the weight of a person while his or her foot is grounded. The arm may hold the spring.

It is possible to control supporting force or a direction to be moved by detecting force that is applied to the spring. In case there is a level difference, return a position of the seat and the armrest, sit on the seat and operate the arm like the above mentioned embodiment.

The moving unit can be applied to a diversity of equipment such as a substitute for wheelchair, care aid equipment, aid equipment for sitting or standing up or rehabilitation equipment.

The moving unit also can be applied to a diversity of traveling robots that requires high reliability to overcome a level difference. Especially, when the moving unit is applied to a robot, the robot can stand up again by itself by the use of the arm in case it overturns.

In addition if the arm is placed a little out of the wheel while the wheel rotates, a pitch per rotation can be changed. The wheel can be rotated through the arm. In case there is a level difference, the wheel may be made to contact a side face of the level difference, then the body portion may be lifted up and the wheel may be rotated with the wheel pushing against the side face of the level difference. Further, the arm can be pulled up in a condition that the arm contacts with the side of the level difference not to rotate the body portion or the arm can be pulled up by making use of reaction to restore its posture when the body portion is pushed forward.

It is a matter of course that the moving unit can be utilized as objects or usages other than overcoming a level difference by making use of the above-mentioned fundamental movement.

Other arrangement may be variously modified without departing from a spirit of the invention.

<Second Embodiment>

Figure 8:
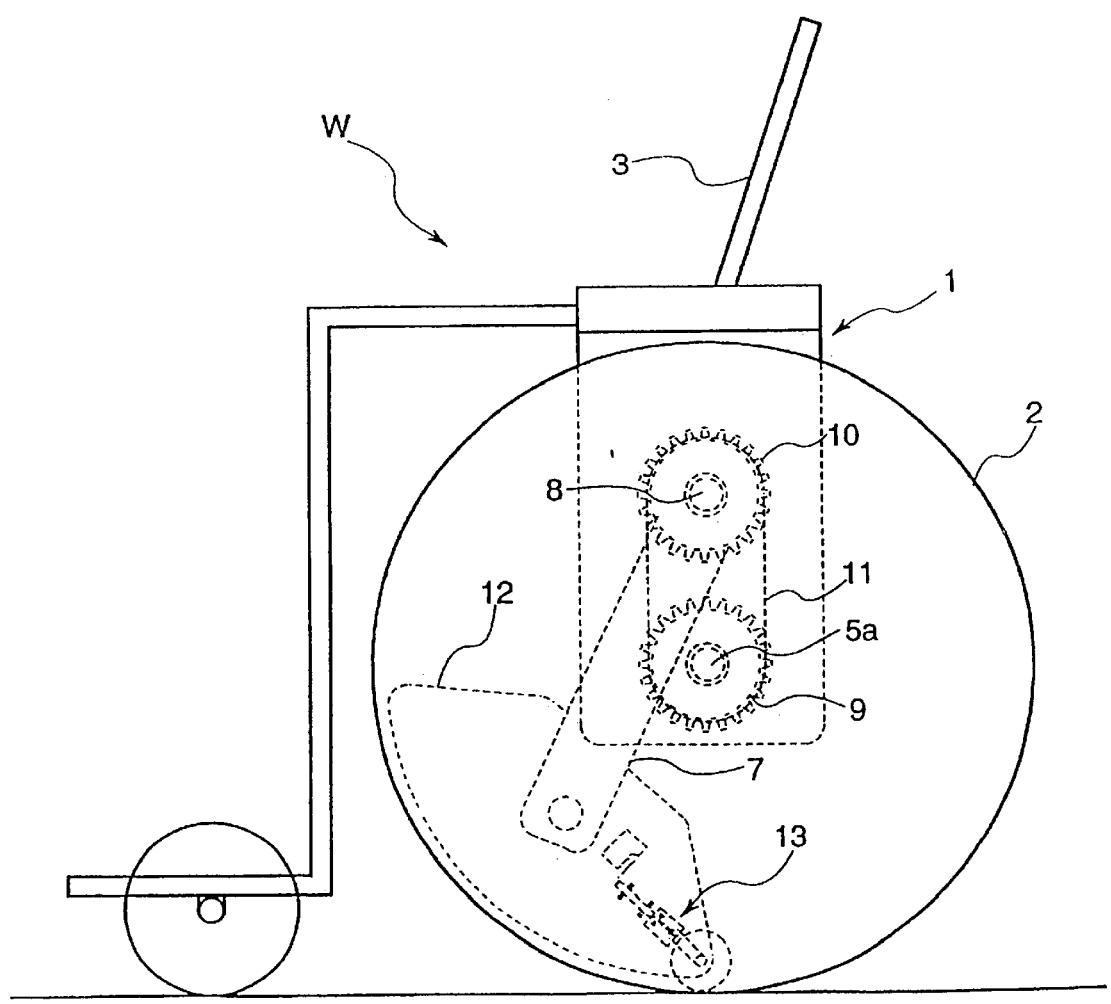
FIG. 8 is a side view of the moving unit.

The embodiment is shown in FIG. 8 wherein a body portion 1 is supported by a pair of wheels 2 in a condition that the body portion can be moved and above the body portion 1 arranged is a seat 3 on which a person can sit.

Figure 7:
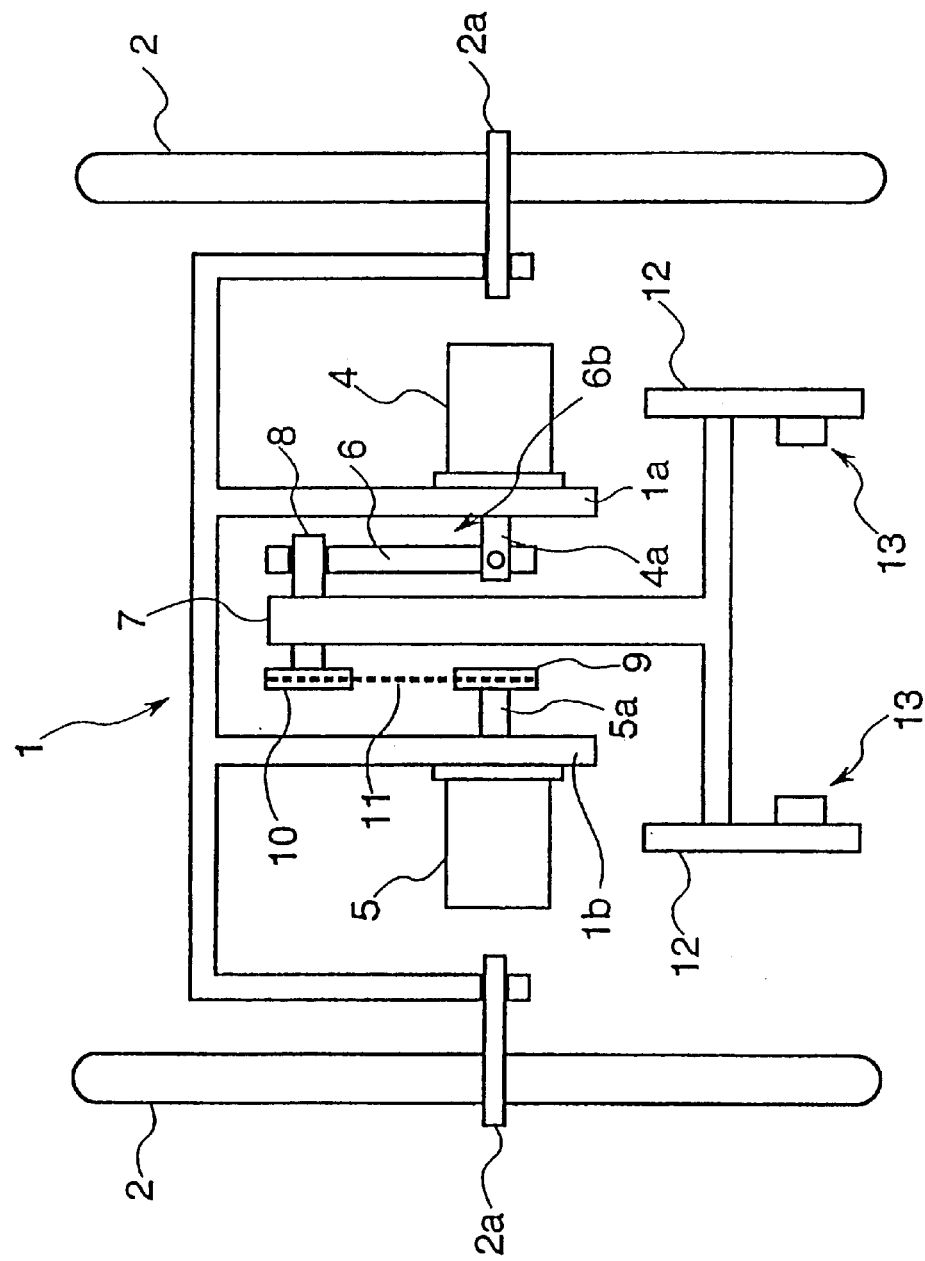
FIG. 7 is a rear view of a moving unit in accordance with a second embodiment of the present claimed invention.

The moving unit comprises, as shown in FIG. 7 and FIG. 8, the above-mentioned wheels 2, a crank 6 as a supporting member that is rotatably mounted at a position that does not interfere rotation of the wheels 2 and an arm 7 that is mounted at a position shifted from a rotational center of the crank 6 and that can move a distal end of the arm 7 toward a direction away from the rotational center of the crank 6 by being driven with the crank 6 as a foothold.

The body portion 1 is provided with a motor 4 for driving the crank 6 and a motor 5 for driving the arm 7 each of which is arranged on the same axis of a pair of flanges 1a, 1b each spaced apart at a predetermined distance and each of which can be driven independently.

A proximal end of the crank 6 is fixed to the motor 4 for driving the crank 6 and a distal end of the crank 6 is elongated so as to rotate around the axis between the flanges 1a and 1b.

A proximal end of the arm 7 is axially connected with the distal end of the crank 6 through a level axle 8, a distal end of the arm 7 is bifurcated and a grounding member 12 that has a partial arc-shaped face to be grounded is mounted on each of the bifurcated distal ends of the arm 7. The grounding member 12 as a portion of the arm 7 that is to be grounded is arc-shaped and makes a movement like rolling on the ground.

A gear 10 is fixed to a projecting end of the level axle 8 and the gear 10 is connected to the gear 9 mounted on the axle 5a of the motor 5 for driving the arm 7 through a chain 11.

More specifically, the crank 6 can be driven by the motor 4 for driving the crank 6 and the arm 7 can be driven by the motor 5 for driving the arm 7. The crank 6 and the arm 7 are incorporated in a condition of being gathered to a center between two wheels 2, 2.

In this embodiment the grounding member 12 of the arm 5 is provided with a detecting means 13 and in case there is a level difference, a shape of the level difference is measured by moving the detecting means 13 with the arm 7 operated.

Figure 9:
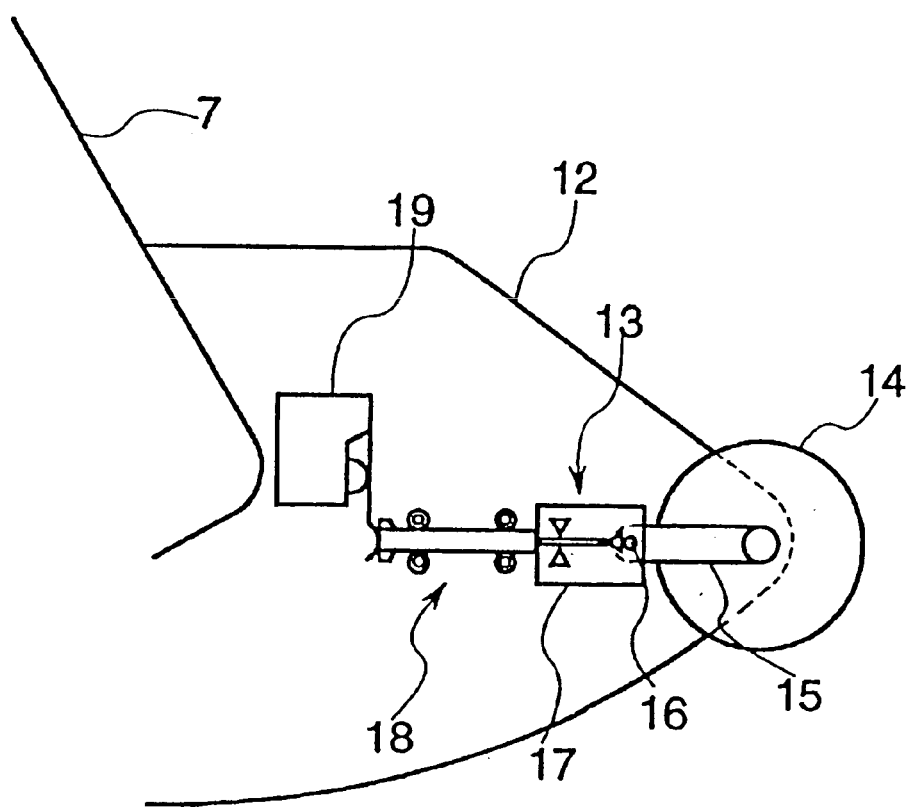
FIG. 9 is a view showing a detecting means of the embodiment.

More specifically, the detecting means 13 is arranged at a rear side of the grounding member 12 and comprises, as shown in FIG. 9, a small wheel 14, a bar 15 on a distal end of which the small wheel 14 is axially mounted and a proximal end of which is supported through a pin 16 in a condition of being able to rock, a first limit switch 17 that detects a direction to which the bar 15 rocks, a linear guide 18 that supports the first limit switch 17 in a condition that the first limit switch 17 can make a linear movement and a second limit switch 19 that detects a linear displacement of the linear guide 18, namely a linear displacement of the small wheel 14.

Figure 10:
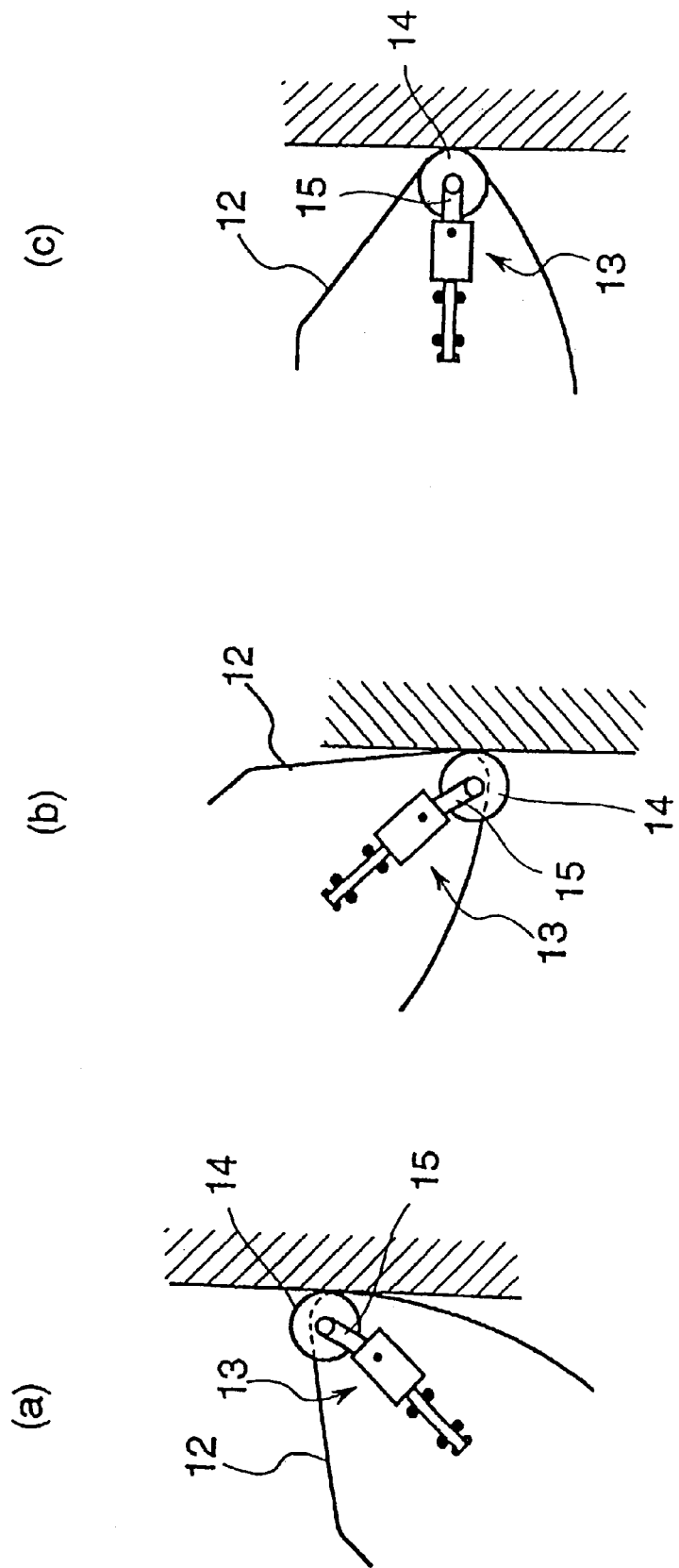
FIG. 10 is an explanatory view of a function of the detecting means.

Whether or not the wheel 2 makes a contact with an object to be detected is detected through the second limit switch 19 and a horizontal and vertical position of the small wheel 14 relative to the wheel 2 can be measured with a rotational angle of the crank 6 and the arm 7 and a state of the first limit switch 17 (namely, a rocking angle of the bar 15). More specifically, the detecting means 13 is able to detect a relative position of the grounded portion appropriately in accordance with a state of the grounding member 12 not only in a state that the bar 15 does not make a rocking movement as shown in FIG. 10(c) but also in a state that the bar 15 makes a rocking movement as shown in FIGS.

10(a),(b). The reason why the bar 15 is made to be able to make a rocking movement is to avoid an excessive load that might be applied to the detecting means 13 during an up and down movement when the small wheel 14 receives reaction from a point with which the small wheel 14 makes a contact and the bar 15 makes a linear movement to a certain degree by making the detecting means 13 recessed with surroundings of the grounding member 12 contact with the point due to a rocking movement of the bar 15.

Figure 11:
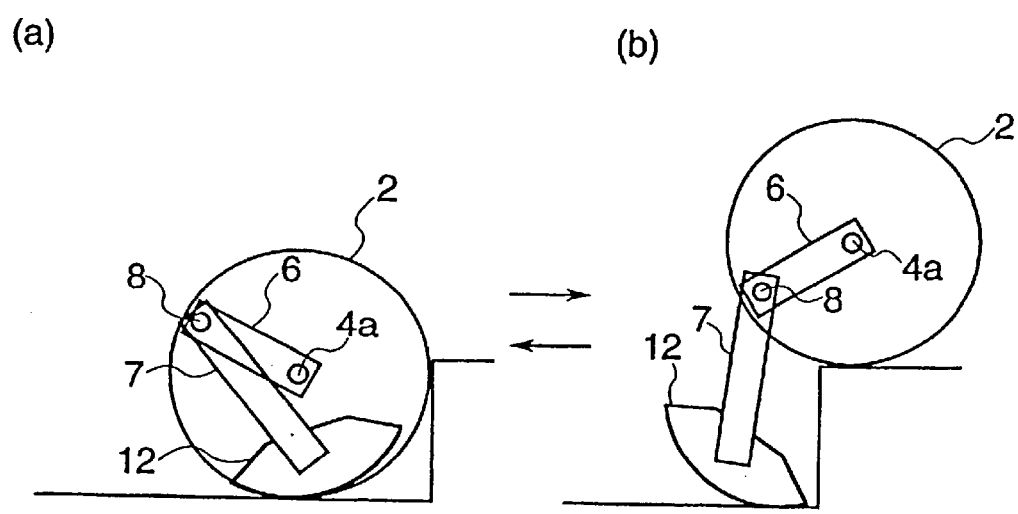
FIG. 11 is an explanatory view of an operation of the moving unit.
Figure 12:
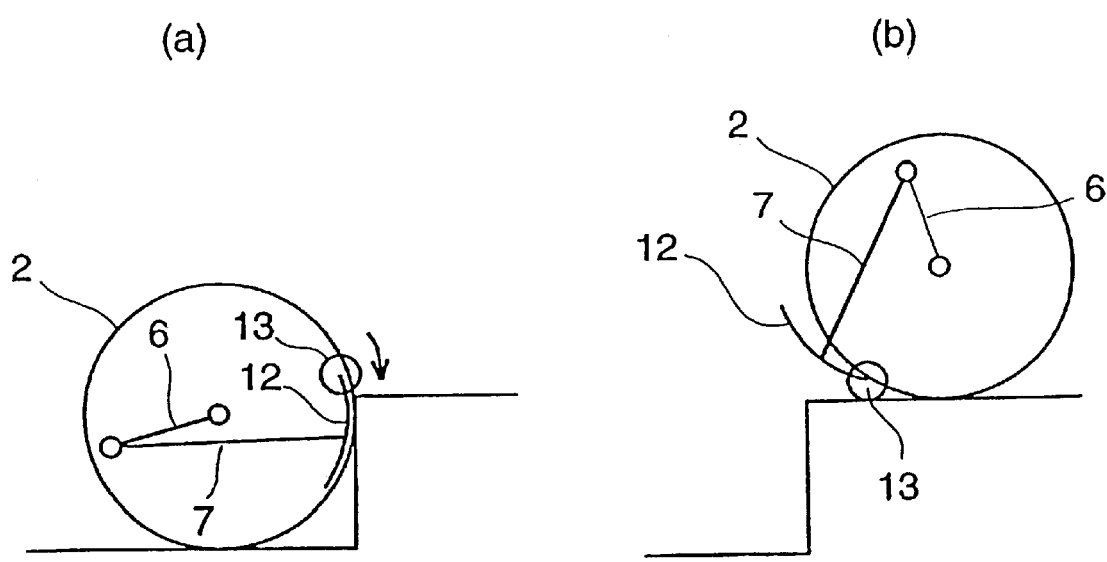
FIG. 12 is an explanatory view of an operation of the detecting means.

Next, a movement of going up a level difference by the use of the moving unit having the above arrangement will be explained with reference to FIG. 11 and FIG. 12.

First, drive the arm 7 through the crank 6 so that the small wheel 14 of the detecting means 13 arranged on the grounding member 12 of the arm 7 draws a track along a circle whose a diameter is a little larger than an outer diameter of the wheel 2 after the wheel 2 makes an abutting contact with an upper level as shown in FIG. 12(a). Detect an edge between a lower level and the upper level by means of the detecting means 13 at an instant when the small wheel 14 becomes free after the small wheel 14 makes an abutting contact with a front wall of the upper level and is separated from the front wall and measure a distance to the upper level and a height of the upper level from an angle of the crank 6 or the arm 7. Determine a condition of driving the arm 7 and the crank 6 for going up the level difference based on the distance and the height obtained in the above procedure.

Specifically, a method of driving the arm 7 and the crank 6 is; drive a motor 5 for driving the arm 7, transfer driving force to the arm 7 through the chain 11 and the second gear 10 so to move the arm 7 and ground the grounding member 12 (FIG. 11(a)).

Next, drive the motor 4 for driving the crank 6 so as to move the grounding member 12 mounted on a distal end of the arm 7 toward a direction away from the wheel 2. More specifically, in a condition that the grounding member 12 contacts the ground, drive the motor 4 for driving the crank 6 so as to rotate the crank 6 around the level axle 8 on which an upper portion of the crank 6 is axially mounted and to pull the body portion 1 up to a position where the level difference can be overcome by making use of reaction of the crank 6 (FIG. 11(b)).

Next, a case the moving unit goes down a level difference will be explained.

First, drive the crank 6 and arm 7 so as to move the wheel 2 with the small wheel 14 of the detecting means 13 arranged on the grounding member 12 of the arm 7 kept in contact with a floor of the upper level as shown in FIG. 12(b), and stop the wheel 2 by detecting an edge between the lower level and the upper level by means of the detecting means 13 at an instant when the small wheel 14 is made free from reaction from the floor. Next, drive the crank 6 and the arm 7 again so as to ground the small wheel 14 on a floor of the lower level and measure a height of the level difference and a distance between the wheel 2 and the small wheel 14 from a reaction that the small wheel 14 receives. Determine a condition of driving the arm 7 and the crank 6 for going down the level difference based on the distance to the level difference, the height of the level difference and a distance to a point to be grounded obtained in the above procedure.

Then drive the motor 4 for driving the crank 6 so that the grounding member 12 mounted on the distal end of the arm 7 gradually approaches to an axis of the motor 4 for driving the crank 6, which makes it possible for the wheel 2 to be grounded on a floor of the lower level by lowering the body portion 1.

The motors 4 and 5 are controlled automatically to be on-off by a control unit, not shown in drawings, based on a driving condition obtained from the above measurement.

The moving unit of the this embodiment does not require any other driving mechanism for detecting a level difference since a movement of the arm 7 that is used for moving up and down is utilized to detect a level difference, which makes it possible to detect a level difference securely without conducting an advanced processing such as an image processing. In addition, since the moving unit makes use of a continuous movement of the arm 7 in accordance with an up and down movement, it is possible to detect a level difference effectively. Further, since all it has to do is control a movement of the arm 7 in accordance with the detected level difference, it is possible to deal with a diversity of level differences with ease.

Especially, since both of the crank 6 and the arm 7 are arranged on the same axis as that of the wheel 2, a relationship between the level difference and the wheel 2 is easy to recognize and safety can effectively be improved with avoiding interference between the arm 7 and the level difference.

Further, since a driving mechanism is concentrated on a central part of the wheels 2, a number of components can be reduced and reliability can effectively be improved.

Each of concrete arrangement is not limited to the above-mentioned embodiment, and there may be various modifications without departing from a spirit of the invention.

For example, an idler gear may be arranged on the crank 6 instead of the chain 11. In addition, the wheels 2 may be supported by the crank 6. Further, the axle 2a may be made hollow so that the motor 4 can be incorporated thereinto.

A position where the detecting means 13 is arranged is not limited to an end portion of the grounding member 12 of the arm 7 but may be formed to elongate a body portion (a portion before a bifurcated portion) of the arm 7. The detecting means 13 is not limited to a contact type, but may be a non-contact type such as an optical sensor or a supersonic wave sensor and may also be supported flexibly through a spring. A mechanism of the detecting means 13 is not limited to a switch type, but may be a displacement instrument, an angle instrument and a load cell that measures contact force and a direction of a level difference or may be a combination of the above.

Further, a load cell may be provided to an operational handle so as to adjust a position of the handle to minimize force applied to the handle while going up and down or moving with the wheels 2.

Timing when the wheels 2 make a contact with an upper level can be detected when a load applied to a motor for driving wheels 2, not shown in drawings, is increased.

POSSIBLE APPLICATIONS IN INDUSTRY

The present claimed invention is embodied in the above-mentioned arrangement and following effects are produced.

(1) First, in the present claimed invention since the supporting member that supports the arm is rotatably mounted on the same axis as that of the axle of the wheel so as not to prevent rotation of the wheel, it is possible to incorporate the supporting member, the arm or other components into the moving unit in a compact state, thereby to effectively avoid mutual interference of the supporting member, the arm with the axle. A function as a level difference overcoming mechanism can effectively be produced by making use of movement of the arm and the supporting member, which makes it possible to utilize the function in a broad range of object such as loading or unloading a load placed near a floor or on a stand, adjusting an angle of a stand or a seat and a guide for preventing overturn in a slope.

(2) In addition, the present claimed invention is so arranged that a level difference is overcome by extending an arm from a body portion and a detecting means is provided at a side where the arm is grounded so as to measure a shape of the level difference by moving the detecting means with an operation of the arm in the level difference.

This arrangement makes it possible that a separately provided detecting means is not required since the arm that is used for an up and down movement can be utilized as the detecting means and an advanced processing such as an image processing is not required as well, resulting in providing a simple and secure function of overcoming a level difference. In addition, since this moving unit makes use of a continuous movement of the arm that makes an up and down movement in order to detect a level difference, it is possible to detect the level difference effectively. Further, it only requires controlling the arm in accordance with the detected level difference, which makes it possible to deal with a diversity of level difference simply and securely.

What is claimed is:

1. A moving unit comprising a wheel that supports a body portion in a condition that the body portion can be moved, a supporting member that is mounted at a position that does not interfere with rotation of the wheel and an arm that is mounted at a position shifted from a rotational center of the supporting member and a distal end of the arm that is movable toward a direction away from the rotational center of the supporting member by being driven with the supporting member as a foothold, wherein the body portion can be lifted up together with the wheel by grounding the distal end of the arm when the moving unit is transported, and wherein when climbing up from a floor of a lower level to a floor of an upper level, the distal end of the arm is grounded on the floor of the lower level, and the arm is driven so as to lift the body portion.

2. The moving unit described in claim 1 wherein a driving system that drives the supporting member and a driving system that drives the arm are arranged so that each of the driving systems operates independently.

3. The moving unit described in claim 2 wherein the supporting member and arm are adjacent an axle of the wheel, and the arm rotates around the axle.

4. The moving unit described in claim 3 wherein a grounding portion of the arm is arc-shaped and so arranged to roll over the ground with lifting up the wheel.

5. The moving unit described in claim 2 wherein a grounding portion of the arm is arc-shaped and so arranged to roll over the ground with lifting up the wheel.

6. The moving unit described in claim 1 wherein a grounding portion of the arm is arc-shaped and so arranged to roll over the ground with lifting up the wheel.

7. A moving unit comprising a wheel that supports a body portion in a condition that the body portion can be moved, a supporting member that is mounted at a position that does not interfere with rotation of the wheel and an arm that is mounted at a position shifted from a rotational center of the supporting member and a distal end of the arm that is movable toward a direction away from the rotational center of the supporting member by being driven with the supporting member as a foothold, and characterized by that a detecting means is provided at a side where the arm is grounded so as to measure a level difference by moving the detecting means to detect an edge between an upper level and a lower level.

8. The moving unit in described in claim 7 wherein the supporting member and arm are adjacent an axle of the wheel, and the arm rotates around the axle.

9. The moving unit described in claim 7 wherein a grounding portion of the arm is arc-shaped and so arranged to roll over the ground with lifting up the wheel.

10. A moving unit comprising a wheel that supports a body portion in a condition that the body portion can be moved, a supporting member that is mounted at a position that does not interfere with rotation of the wheel and an arm that is mounted at a position shifted from a rotational center of the supporting member and a distal end of the arm that is movable toward a direction away from the rotational center of the supporting member by being driven with the supporting member as a foothold, wherein the body portion can be lifted up together with the wheel by grounding the distal end of the arm when moving unit is transported, wherein the supporting member, the arm and the distal end of the arm are housed within a diameter of the wheel when not in use.

* * * * *